(12) United States Patent
Nakamura et al.

(10) Patent No.: US 7,589,878 B2
(45) Date of Patent: Sep. 15, 2009

(54) OPTICAL SCANNING DEVICE AND IMAGE FORMING APPARATUS

(75) Inventors: Tadashi Nakamura, Kanagawa (JP); Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/277,317

(22) Filed: Nov. 25, 2008

(65) Prior Publication Data

US 2009/0074459 A1 Mar. 19, 2009

Related U.S. Application Data

(62) Division of application No. 11/889,033, filed on Aug. 8, 2007, now Pat. No. 7,471,434.

(30) Foreign Application Priority Data

Sep. 1, 2006 (JP) ............................ 2006-237853

(51) Int. Cl.
*G02B 26/08* (2006.01)
*B41J 27/00* (2006.01)

(52) U.S. Cl. ............... 359/204.2; 359/204.1; 359/216.1; 347/232; 347/243

(58) Field of Classification Search ............... 359/204.1, 359/204.2
See application file for complete search history.

(56) References Cited

U.S. PATENT DOCUMENTS

| | | | |
|---|---|---|---|
| 3,646,568 A | 2/1972 | Woywood | |
| 6,934,061 B2 | 8/2005 | Ono et al. | |
| 6,977,762 B2 | 12/2005 | Hayashi | |
| 7,006,120 B2 | 2/2006 | Sakai et al. | |
| 7,050,210 B2 | 5/2006 | Atsuumi et al. | |
| 7,145,705 B2 | 12/2006 | Hayashi | |
| 7,154,651 B2 | 12/2006 | Atsuumi et al. | |
| 7,164,516 B2 | 1/2007 | Hayashi et al. | |
| 7,218,432 B2 | 5/2007 | Ichii et al. | |
| 7,233,425 B2 | 6/2007 | Hayashi | |
| 7,236,281 B2 | 6/2007 | Hayashi et al. | |
| 7,436,564 B2* | 10/2008 | Gomi et al. ............... | 359/213.1 |
| 2004/0036936 A1 | 2/2004 | Nakajima et al. | |
| 2006/0000990 A1 | 1/2006 | Hayashi et al. | |
| 2006/0077500 A1 | 4/2006 | Hayashi et al. | |
| 2006/0232659 A1 | 10/2006 | Hayashi et al. | |
| 2006/0256185 A1 | 11/2006 | Suzuki et al. | |
| 2006/0284968 A1 | 12/2006 | Hayashi et al. | |
| 2007/0035796 A1* | 2/2007 | Nakajima ................... | 359/204 |

(Continued)

FOREIGN PATENT DOCUMENTS

JP 2001-083452 3/2001

(Continued)

*Primary Examiner*—James Phan
(74) *Attorney, Agent, or Firm*—Dickstein Shapiro LLP

(57) ABSTRACT

A common photodetecting unit detects a plurality of beams scanned by a plurality of polyhedral reflection mirrors provided in a multiple stages with a common rotation axis, and generates a synchronization detection signal based on detected beams. The reflection mirrors make a predetermined angle $\theta 1$ in a direction of rotation of the reflection mirrors. When time between two consecutive synchronization detection signals on a time line generated by the common photodetecting unit is $t_i$, where $i$ is a positive integer equal to or smaller than number of split beams, at least one of $t_i$ is different from others.

8 Claims, 6 Drawing Sheets

U.S. PATENT DOCUMENTS

2007/0058255 A1 3/2007 Imai et al.
2007/0081217 A1 4/2007 Hayashi et al.
2007/0091398 A1 4/2007 Ueda et al.

FOREIGN PATENT DOCUMENTS

JP 2002-023085 1/2002
JP 2005-092129 4/2005

* cited by examiner

OPTICAL SCANNING DEVICE AND IMAGE FORMING APPARATUS

CROSS-REFERENCE TO RELATED APPLICATIONS

The present application is a divisional of application Ser. No. 11/889,033, filed Aug. 8, 2007, now U.S. Pat. No. 7,471,434, which claims priority to Japanese priority document 2006-237853 filed in Japan on Sep. 1, 2006, the entire disclosures of which are incorporated herein.

BACKGROUND OF THE INVENTION

1. Field of the Invention

The present invention relates to an optical scanning device and an image forming apparatus.

2. Description of the Related Art

A conventional technology for scanning a surface of a document by different beams emitted from a common light source using a pyramidal mirror or a plane mirror is disclosed in Japanese Patent Application Laid-Open No. 2002-23085.

Although the number of the light sources can be decreased by using the common light source with the technology described above, it is difficult to increase an operation speed because the number of surfaces of a deflecting mirror cannot be increased more than two.

A tandem-type image forming apparatus including a plurality of photosensitive elements (normally, four photosensitive elements) is increasingly commercialized because an electrophotographic image forming apparatus, such as a laser printer, a digital copying machine, a plain-paper facsimile, is improved to form a color image with an increased operation speed. An electrophotographic color image forming apparatus can be configured in such a manner that the photosensitive elements rotate as many times as the number of necessary colors (e.g., if one drum is provided for four colors, the drum needs to rotate four times), which may cause a poor productivity.

With the tandem-type image forming apparatus, the number of light sources needs to be increased, increasing the number of necessary components. As a result, a color misalignment is likely to occur due to a difference in wavelengths of the light sources, and more costs are required. In addition, a failure may occur in a writing unit due to a degradation of the light source such as a semiconductor laser. When the number of the light sources is increased, the possibility of the occurrence of a failure is increased, resulting in a difficulty in reuse of the components.

A technology employing a single light source is disclosed in Japanese Patent Application Laid-Open No. 2005-92129, in which a beam emitted from the single light source is split and each of split beams is led to a different scanning target surface.

Even though the number of the light sources can be decreased with the above technology, although a high-speed output of an image can be achieved, if a single synchronization detection sensor obtains synchronous signals for two stations or more, the stations cannot be electrically distinguished from each other because a time taken for scanning each of the stations is identical. As a result, it is difficult to perform a feed back control for correcting a timing of starting a writing for each station.

SUMMARY OF THE INVENTION

It is an object of the present invention to at least partially solve the problems in the conventional technology.

An optical scanning device according to one aspect of the present invention includes a common light source that is driven by a modulation; a deflecting unit including a plurality of polyhedral reflection mirrors provided in a multiple stages with a common rotation axis; a beam splitting unit that splits a beam emitted from the common light source and outputs split beams to the reflection mirrors in different stages; and a common photodetecting unit that detects a plurality of beams scanned by the reflection mirrors in different stages, and generates a synchronization detection signal based on detected beams. The split beams respectively scan different scanning target surfaces. The reflection mirrors make a predetermined angle θ1 in a direction of rotation of the reflection mirrors. When time between two consecutive synchronization detection signals on a time line generated by the common photodetecting unit is ti, where i is a positive integer equal to or smaller than number of the split beams, at least one of ti is different from others.

An optical scanning device according to another aspect of the present invention includes a plurality of common light sources that is driven by a direct modulation; a deflecting unit including a reflection mirror having N number of surfaces, where N is a positive integer; a beam splitting unit that splits a beam emitted from the common light sources and outputs a split beam to the reflection mirror; a scanning optical system that guides a beam scanned by the deflecting unit to a scanning target surface; and a common photodetecting unit that detects a plurality of split beams scanned by the deflecting unit. The split beams respectively scan different scanning target surfaces. Incident directions of the beams incident on the reflection mirror from the common light sources make a predetermined angle θ2 in a direction of rotation of the reflection mirror. When time between two consecutive synchronization detection signals on a time line generated by the common photodetecting unit is ti, where i is a positive integer equal to or smaller than number of the split beams, at least one of ti is different from others.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
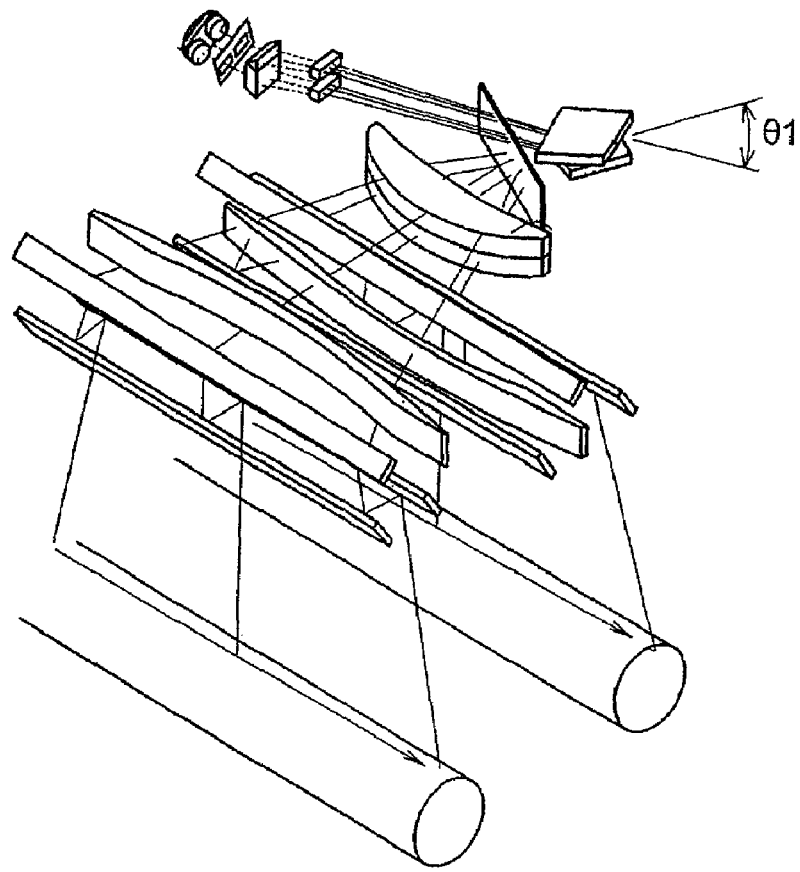
FIG. 1 is a schematic diagram of a configuration of an optical scanning device according to a first embodiment of the present invention.

Exemplary embodiments of the present invention are explained in detail below with reference to the accompanying drawings. FIG. 1 is a schematic diagram of a configuration of an optical scanning device according to a first embodiment of the present invention.

A dispersing light-flux emitted from a semiconductor laser (a common light source) is converted into any one of a weak converging light-flux, a parallel light-flux, and a weak dispersing light-flux, by a coupling lens. A beam emitted from the coupling lens passes through an aperture for stabilizing a spot size on a surface to be scanned, and is incident on a half-mirror prism.

The beam incident on the half-mirror prism from the common light source is split into an upper beam and a lower beam, so that four beams are emitted from the half mirror.

Figure 2:
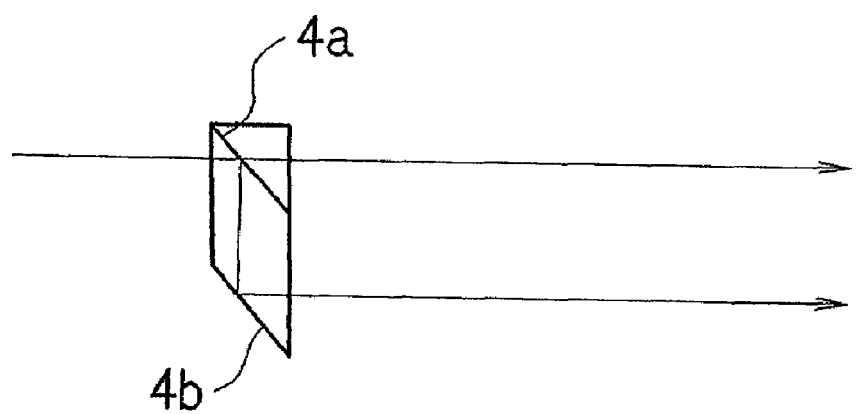
FIG. 2 is a side view of a half-mirror prism in a sub-scanning direction according to the first embodiment.

FIG. 2 is a side view of the half-mirror prism in a sub-scanning direction according to the first embodiment. A half mirror 4a splits an incoming beam into a transmitted beam and a reflected beam in the proportion of one to one. A total reflection plane 4b includes a function for changing a direction of the beam. Although the half-mirror prism is used in the first embodiment, it is possible to realize a mirror system including a single half mirror and a normal mirror. The beam is not necessarily split into two beams in the proportion of one to one by the half mirror, and the ratio of split beams can be changed depending on a condition of other optical systems.

The beam emitted from the half mirror is converted into a line image extended in a main-scanning direction near a deflecting reflection surface, by a cylindrical lens provided on each of an upper stage and a lower stage. As a deflecting unit, a polygon mirror is provided on each of the upper stage and the lower stage arranged with an angle ($\theta 1$) kept from each other in a rotation direction. In this case, tetrahedral polygon mirrors are arranged with an angle $\theta 1 = 44°$ ($\neq \pi/N$, where N is the number of surfaces of the polygon mirrors) kept from each other in the rotation direction. The polygon mirrors provided on the upper stage and the lower stage can be integrally arranged. On the other hand, the polygon mirrors can be separately provided on the upper stage and the lower stage, and combined when used.

Figure 3:
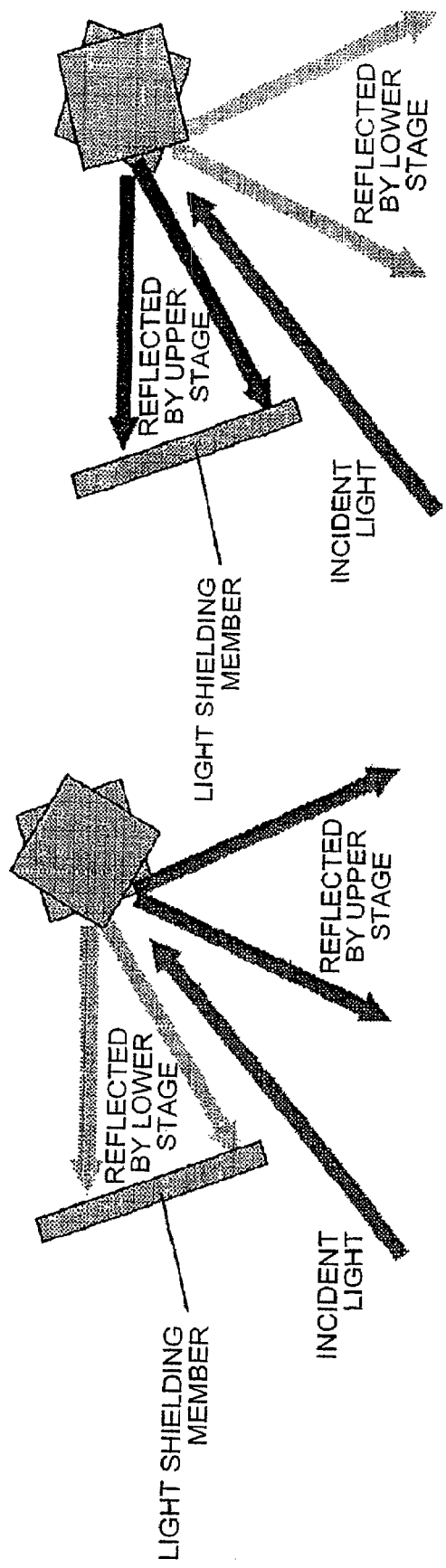
FIG. 3 is a schematic diagram of a state for scanning a photosensitive element (scanning target surface) by a beam from an upper stage of a common light source according to the first embodiment.

It is preferable to realize a configuration as shown in FIG. 3, in which the lower beam does not reach the scanning target surface when the upper beam from the common light source scans the photosensitive element surface (scanning target surface). In this case, it is preferable to shield the lower beam by a light shielding member.

On the other hand, it is preferable to realize a configuration in which the upper beam does not reach the scanning target surface when the lower beam from the common light source is scanning the photosensitive element surface (scanning target surface), which is different from the photosensitive element surface scanned by the upper beam. A timing of driving a modulation is set to be different for each of the upper stage and the lower stage. Accordingly, when the photosensitive element corresponding to the upper stage is scanned, the modulation of the light source is driven based on image data of a color (e.g., black) corresponding to the upper stage. On the other hand, when the photosensitive element corresponding to the lower stage is scanned, the modulation of the light source is driven based on image data of a color (e.g., magenta) corresponding to the lower stage.

Figure 4:
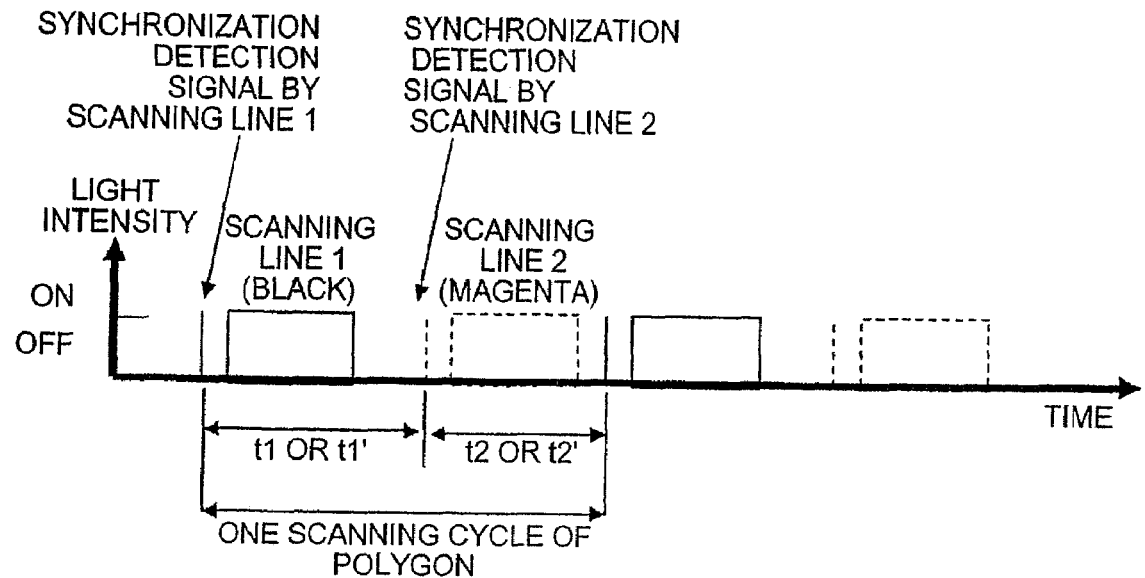
FIG. 4 is a timechart for explaining a state with all turning-ON according to the first embodiment.

FIG. 4 is a timechart for explaining a state in which black and magenta are exposed by the common light source, with all turning-ON in a valid scanning area. In an example described in connection with FIG. 4, solid lines indicate portions corresponding to black, while doted lines indicate portions corresponding to magenta. A timing of a start of a drawing of black and magenta is determined based on a detection of a scanning beam by a synchronous-beam receiving unit provided outside the valid scanning area. Although the synchronous-beam receiving unit is not shown in the drawings, a photo diode is generally used as the synchronous-beam receiving unit.

According to the first embodiment, a scanning time t1 for scanning a scanning target area including the outside of the valid scanning area in the upper stage, and a scanning time t2 for scanning a scanning target area including the outside of the valid scanning area in the lower stage is different because of the assumption of $\theta 1 = 44°$ ($\neq \pi/N$). With the above configuration, synchronization detection signals for the upper stage and the lower stage are distinguished from each other by comparing t1 with t2. Accordingly, when scanning the upper stage, the modulation of the light source is driven based on the image data corresponding to black, while, when scanning the lower stage, the modulation of the light source is driven based on the image data corresponding to magenta.

When manufacturing a polygon mirror configured with a two-staged polyhedral reflection mirror, a component tolerance, which corresponds to an angular difference $\theta 1$ between the upper stage and the lower stage, possibly occurs. In this case, because the component tolerance is ±0.5°, as long as $\theta 1$ satisfies $\theta 1 \leq \pi/N - 0.5°$ or $\theta 1 \geq \pi/N + 0.5°$, even when the component tolerance occurs, the synchronization detection signals obtained by the beams when scanning the upper stage and the lower stage can be distinguished from each other, and the modulation of the light source can be driven based on the image data for each station. Furthermore, if a difference between the $\theta 1$ and 45° is equal to or smaller than −0.5°, or equal to or larger than +0.5°, it is sufficiently possible to electrically distinguish t1 from t2.

For example, when the polygon mirror is rotated at a frequency of 60,000 revolution per minute (rpm), which is one of the fastest frequencies in current technology, it takes 1.4 microseconds for scanning 0.5°. When using the polygon mirror with $\theta 1 = 44.5°$, and if values of t1 and t2 when performing a scan by the polygon mirror with $\theta 1 = 45°$ is assumed that $t1 = t2 = t0$, t1 is obtained by adding t0 to 1.4 microseconds, while t2 is obtained by subtracting 1.4 microseconds from t0. As a result, a time difference between t1 and t2 becomes 2.8 microseconds. The clock frequency for modulating the light source is generally a few dozens megahertz, so that a time for one count is ordered by a few dozens nanoseconds. When using the polygon mirror with $\theta 1 = 44.5°$, the time difference between t1 and t2 results in an electrical difference corresponding to a range between a few dozens counts and a few hundred of counts. In this manner, t1 and t2 can be electrically distinguished easily.

It is well known that, when $\theta 1$ equals to $\pi/N$, the widest valid scanning area can be obtained, and an occurrence of a ghost light can be effectively suppressed. Therefore, $\theta 1$ is assumed to be near $_\pi/N$ although a condition of $\theta 1 \neq _\pi/N$ needs to be satisfied at the same time.

Figure 5:
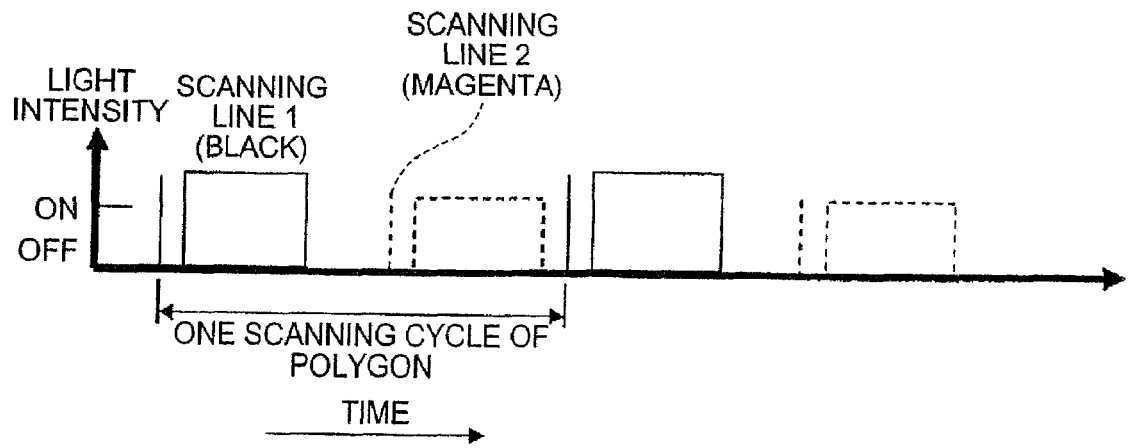
FIG. 5 is a schematic diagram for explaining a state for scanning surfaces of different photosensitive elements by beams with different light intensities, according to the first embodiment.

The light intensity in areas for black and magenta are theoretically same with each other in the example described in connection with FIG. 4. However, if the light intensity of the light source is actually set in the same amount, each of the light intensities output to the photosensitive element cannot be actually the same because transmittance and reflectance of optical elements are relatively different for each area. As shown in FIG. 5, it is possible to have the same light intensity output to the different photosensitive element surfaces by changing set light intensity for scanning different photosensitive element surfaces.

Figure 6:
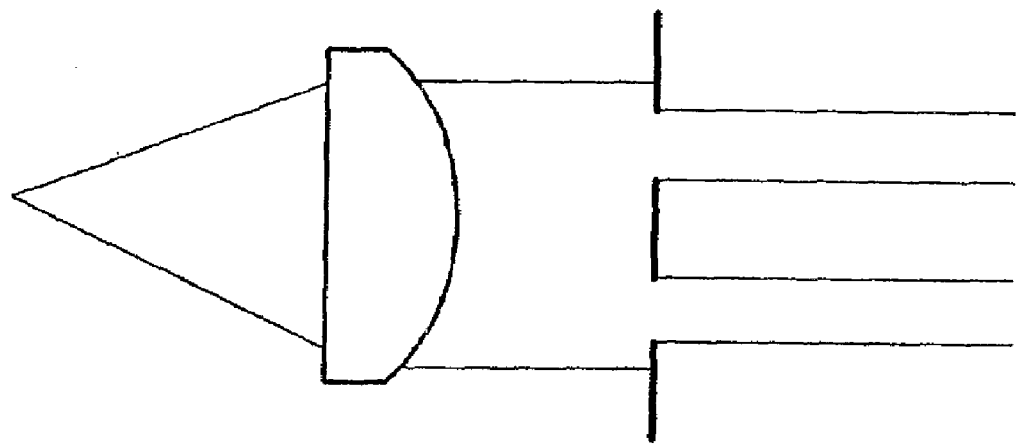
FIG. 6 is a schematic diagram for explaining a state of splitting a beam according to the first embodiment.

FIG. 6 is a schematic diagram for explaining a state of splitting a beam from the light source to the aperture in a sub-scanning direction according to the first embodiment. The beam emitted from the coupling lens passes through a plurality of the apertures provided respectively in the upper stage and the lower stage in a sub-scanning direction. Accordingly, the beam can be split without using the half mirror. As a result, necessary light intensity can be easily assured, costs can be reduced, and the number of the components can be decreased.

Figure 7:
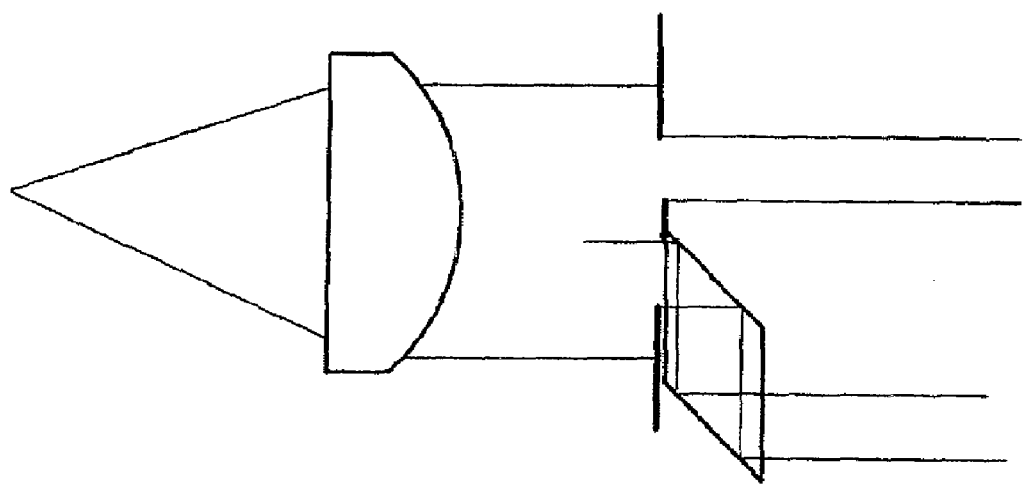
FIG. 7 is a schematic diagram for explaining a beam splitting unit according to the first embodiment.

FIG. 7 is a schematic diagram for explaining a beam splitting unit according to the first embodiment.

One of the beams passed through the apertures passes through a prism, so that a distance between the upper beam and the lower beam is widened in the sub-scanning direction. Accordingly, the center portion of the beam passed through the coupling lens can be obtained. As a result, compared to the configuration described in connection with FIG. 6, the necessary light intensity can be more easily assured and a diameter of the beam spot can be shortened.

A second embodiment of the present invention is described with reference to the drawings. According to the second embodiment, a beam incident on a photosensitive element surface (scanning target surface) and another beam incident on another photosensitive element surface (scanning target surface) have respective incident angles to a polygon mirror, in a rotation direction of the polygon mirror. In this case, an angular difference ($\theta 2$) between the incident angles of the above beams incident on the polygon mirror in the rotation direction is assumed to be $\theta 2=44° (\neq_\pi/N)$. The angle between the two beams incident on the polygon mirror in the rotation direction is shown in FIG. 8.

Figure 8:
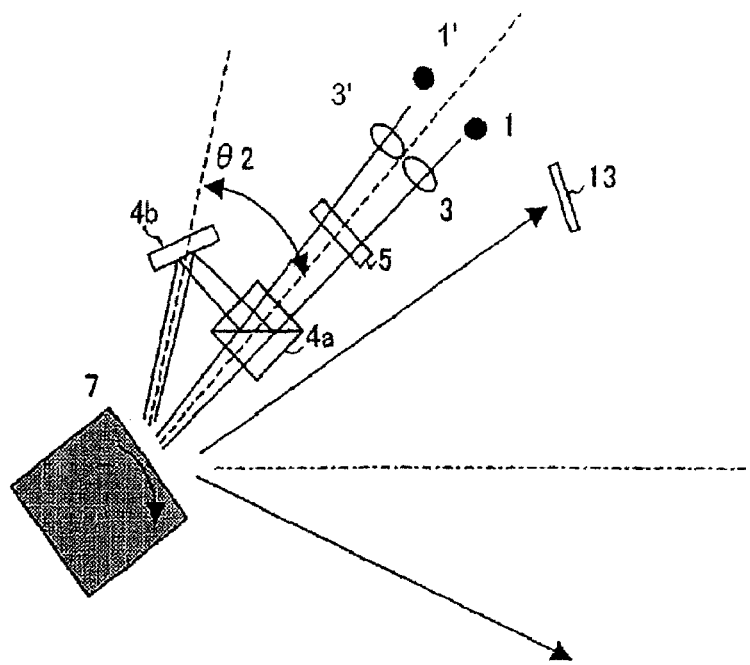
FIG. 8 is a schematic diagram for explaining an angle between two beams incident on a polygon mirror in a rotation direction according to a second embodiment of the present invention.

With the configuration shown in FIG. 8, times taken for scanning the scanning target areas by each of the two beams become different from each other. Therefore, the synchronization detection signals respectively generated when the two beams pass through the synchronous-beam receiving unit can be distinguished from each other.

Figure 9:
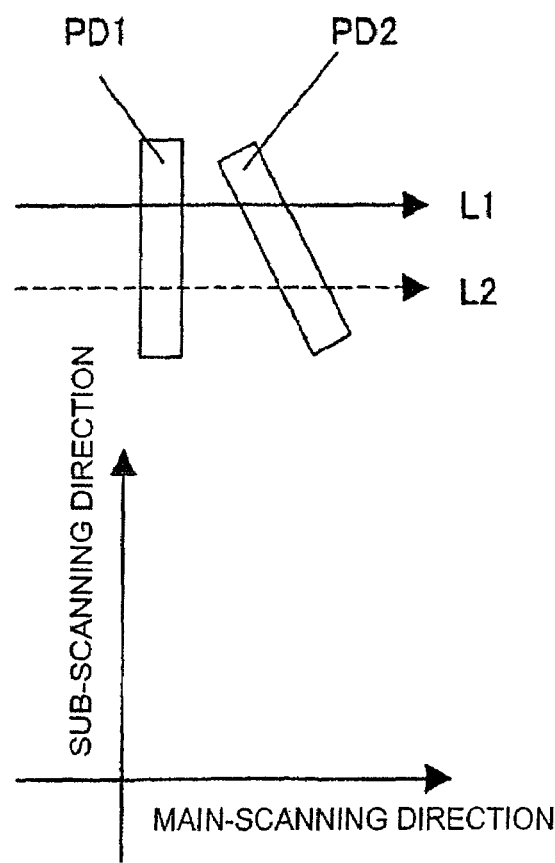
FIG. 9 is a schematic diagram for explaining a state where photodetectors are arranged in a nonparallel manner according to a third embodiment of the present invention.

FIG. 9 is a schematic diagram for explaining a state where photodetectors PD1 and PD2 are arranged in a nonparallel manner, according to a third embodiment of the present invention.

Assuming that a beam emitted from the common light source and separated into two beams L1 and L2 in the sub-scanning direction, times taken by the beams to respectively pass through the photodetectors PD1 and PD2 on the nonparallel photodetector (PD) become different from each other, as shown in FIG. 9. Accordingly, by employing the nonparallel PD as the synchronous-beam receiving unit, it is possible to distinguish the synchronization detection signals generated when L1 and L2 respectively pass through the synchronous-beam receiving unit.

Figure 10:
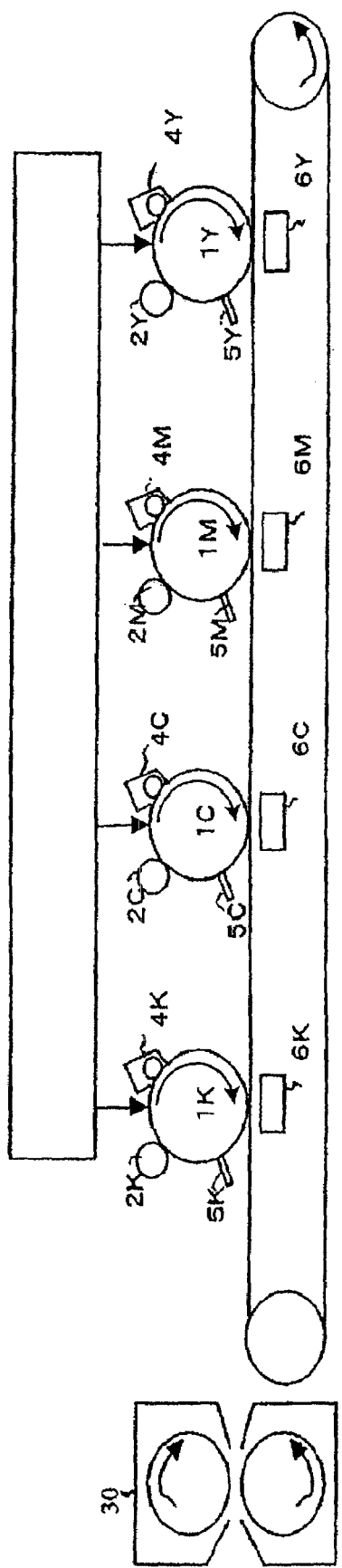
FIG. 10 is a schematic diagram of a typical multicolor image forming apparatus.

A fourth embodiment of the present invention is described with reference to the drawings. FIG. 10 is a schematic diagram of a typical multicolor image forming apparatus.

In an example shown in FIG. 10, photosensitive elements 1Y, 1M, 1C, and 1K rotate in a clockwise direction. Charging devices 2Y, 2M, 2C, and 2K, developing devices 4Y, 4M, 4C, and 4K, transfer charging units 6Y, 6M, 6C, and 6K, and cleaning units 5Y, 5M, 5C, and 5K are respectively arranged in the rotation direction of the photosensitive elements 1Y, 1M, 1C, and 1K.

The charging devices 2Y, 2M, 2C, and 2K are charging units constituting a charging device for uniformly charging the photosensitive element surfaces. A beam is irradiated on the photosensitive element surface between the charging device 2Y and the developing device 4Y, 2M and 4M, 2C and 4C, and 2K and 4K, by a writing unit, so that an electrostatic latent image is formed on each of the photosensitive elements. Based on the electrostatic latent images, a toner image is formed on each of the photosensitive element surfaces by the developing devices 4Y, 4M, 4C, and 4K. The toner image for each color is subsequently transferred to a sheet paper by the transfer charging units 6Y, 6M, 6C, and 6K, and transferred image is fixed on the sheet paper by a fixing unit 30.

Although it is assumed that the two beams are used for scanning the photosensitive element according to the first embodiment, it is possible to use one beam for scanning one photosensitive element. Furthermore, a configuration including the two photosensitive elements is shown in FIG. 1; however, it is possible to scan four photosensitive elements when same optical systems described in connection with FIG. 1 is arranged in a manner to sandwich the polygon mirror.

According to an aspect of the present invention, it is possible to provide an optical scanning device capable of outputting an image at a high speed. Furthermore, the number of components can be decreased and costs can be reduced. Moreover, it is possible to suppress an occurrence of a failure in an entire unit, and the entire unit can be increasingly reused. Furthermore, it is possible to suppress power consumption, so that the optical scanning system can be more adjustable to an office environment. Moreover, because the beam emitted from the common light source can be split, a quality difference between the beams that scan different photosensitive element surfaces can be reduced, so that a quality of an image can be improved. Furthermore, it is possible to obtain the synchronous signal capable of being distinguished for each station, even with one synchronization detection sensor. As a result, the number of the synchronization detection sensors can be reduced while a preferable image can be obtained at the same time.

Moreover, according to another aspect of the present invention, it is possible to shorten a width of a deflecting unit (e.g., a polygon mirror) in the sub-scanning direction. As a result, it is possible to reduce a noise and to realize an energy saving.

Furthermore, according to still another aspect of the present invention, it is possible to decrease the number of the synchronization detection sensors without degrading the quality of an image, and costs can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a plurality of common light sources that is driven by a direct modulation;

a deflecting unit including a reflection mirror having N number of surfaces, where N is a positive integer;

a beam splitting unit that splits a beam emitted from each of the common light sources and outputs a split beam to the reflection mirror;

a scanning optical system that guides a beam scanned by the deflecting unit to a scanning target surface; and a common photo detecting unit that detects a plurality of split beams scanned by the deflecting unit, wherein the split beams respectively scan different scanning target surfaces, incident directions of the beams incident on the reflection mirror from the common light sources make a predetermined angle $\theta 2$ in a direction of rotation of the reflection mirror, and when time between two consecutive synchronization detection signals on a time line generated by the common photodetecting unit is ti, where i is a positive integer equal to or smaller than number of the split beams, at least one of ti is different from others.

2. The optical scanning device according to claim 1, wherein the beams from the light sources are incident on the reflecting mirror in two different directions including a first direction and a second direction, and time t1' taken from a first timing at which the beam in the first direction is incident on the common photodetecting unit and causes the synchronization detection signal to be generated to a second timing at which the beam in the second direction is incident on the common photodetecting unit and causes the synchronization detection signal to be generated is different from time t2' taken from the second timing to the first timing.

3. The optical scanning device according to claim 1, wherein number of the incident directions of the beams incident on the reflection mirror N and the predetermined angle $\theta 2$ satisfy $\theta 2 \neq \pi/N$.

4. The optical scanning device according to claim 3, wherein the incident direction of the beams from the light sources are set to make a predetermined angle in a direction perpendicular to the direction of rotation of the reflecting mirror.

5. The optical scanning device according to claim 1, wherein number of common photodetecting units is one.

6. The optical scanning device according to claim 1, wherein the common photodetecting unit is a nonparallel photodiode sensor provided outside a writing area in a main-scanning direction of the optical scanning device.

7. An image forming apparatus that forms an electrostatic lateral image on each of a plurality of photosensitive elements, forms a toner image by visualizing the electrostatic latent image, and synthesizing an image on a sheet-type recording medium by transferring toner images on the recording medium, the image forming apparatus comprising an optical scanning device according to claim 1.

8. The image forming apparatus according to claim 7, wherein number of the photosensitive elements is four, the optical scanning device includes two light sources that respectively emit beams for performing the optical scanning on four of the photosensitive elements, and the electrostatic latent images formed on four of the photosensitive elements are respectively visualized with magenta, yellow, cyan, and black toners to form a color image.

* * * * *